(12) United States Patent
Jayavant et al.

(10) Patent No.: US 6,967,659 B1
(45) Date of Patent: Nov. 22, 2005

(54) CIRCUITRY AND SYSTEMS FOR PERFORMING TWO-DIMENSIONAL MOTION COMPENSATION USING A THREE-DIMENSIONAL PIPELINE AND METHODS OF OPERATING THE SAME

(75) Inventors: Rajeev Jayavant, Fort Collins, CO (US); David W. Nuechterlein, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 446 days.

(21) Appl. No.: 09/648,173

(22) Filed: Aug. 25, 2000

(51) Int. Cl.[7] .............................................. G06T 1/20
(52) U.S. Cl. ..................................... 345/506; 345/505
(58) Field of Search .............................. 345/506, 582, 345/473, 557, 519, 531, 419, 611, 505, 699, 345/797, 629; 709/219; 712/36; 348/599, 348/445; 708/200; 710/51, 113

(56) References Cited

U.S. PATENT DOCUMENTS 5,394,524 A * 2/1995 DiNicola et al. ........... 345/506
6,208,350 B1 * 3/2001 Herrera ....................... 345/582
6,275,239 B1 * 8/2001 Ezer et al. .................. 345/473

* cited by examiner

Primary Examiner—Kee M. Tung
Assistant Examiner—Dalip K. Singh

(57) ABSTRACT

The present invention introduces circuitry and systems for performing two-dimensional motion compensation using a three-dimensional pipeline, as well as methods of operating the same. According to an exemplary embodiment, image processing circuitry is provided and includes both a two-dimensional image pipeline, which is operable to process two dimensional image data to generate successive two-dimensional image frames, and a three-dimensional image pipeline, which is operable to process three-dimensional image data to render successive three-dimensional image frames. The image processing circuitry further includes dual mode sub-processing circuitry, which is associated with each of the two- and three-dimensional image pipelines. The dual mode sub-processing circuitry is operable to perform motion compensation operations associated with the two-dimensional image pipeline in one mode and to perform rasterization operations associated the three-dimensional image pipeline in another mode.

30 Claims, 5 Drawing Sheets

CIRCUITRY AND SYSTEMS FOR PERFORMING TWO-DIMENSIONAL MOTION COMPENSATION USING A THREE-DIMENSIONAL PIPELINE AND METHODS OF OPERATING THE SAME

TECHNICAL FIELD OF THE INVENTION

The present invention is directed, in general, to image processing systems and, more specifically, to circuitry and systems for performing two-dimensional motion compensation using a three-dimensional pipeline and methods of operating the same.

BACKGROUND OF THE INVENTION

The ever-increasing demand for faster image processing systems dictates that state-of-the-art image processors execute instructions and process data in the minimum amount of time. Over the years, image processor speeds have been increased in a variety of ways, including, increasing the speed of the clock that drives the processor, reducing the number of clock cycles required to perform a given instruction, reducing the number of gate delays incurred while executing an instruction, increasing the number of instruction pipelines, and the like.

An instruction pipeline is a series of separate instruction processing stages. Each stage is independent and is optimized to perform a specific portion of the overall instruction processing. Thus, instructions may be fed into the first stage of the pipeline and each stage performs a specific portion of the instruction, much like an assembly line. It is typically not necessary for one instruction to finish processing before the next instruction is loaded into the pipeline. Multiple instructions may therefore be loaded into the instruction pipeline (e.g., a five stage instruction pipeline may contain up to five instructions at one time).

The instruction pipeline concept has been extended to multiple pipeline architectures. In a multiple pipeline architecture, an instruction decoder feeds instructions to two or more instruction pipelines. The instruction decoder may select a particular pipeline based on which instructions are already in each pipeline, how fast the instructions are expected to flow through the remaining pipeline stages, the "speciality" of the particular pipeline, or the like.

Multiple pipeline architectures are well suited for processing two-dimensional and three-dimensional image data ("graphics processing"). Graphics processing techniques commonly describe images in terms of the dimensions of the objects to be represented. For instance, an image processing system may represent objects in two-dimensional space (e.g., having x and y coordinates, wherein the graphics are said to be "two-dimensional"), and three-dimensional (e.g., having x, y, and z coordinates, wherein the graphics are said to be "three-dimensional").

Graphics processing systems commonly display two-dimensional and three-dimensional graphics representations of objects on a two-dimensional image display screen (e.g., computer monitor, television, etc.). These systems "break down" the graphical representation of an object into graphics primitives (e.g., points, lines, quadrilaterals, triangle strips, polygons, etc.) and process the same in one of two image-processing pipelines. If the object is represented in two-dimensional image space, then it is processed in a two-dimensional image pipeline to generate successive two-dimensional image frames. If the object is represented in three-dimensional image space, then it is processed in a three-dimensional image pipeline to render successive three-dimensional image frames.

For instance, the primitives of a three-dimensional object to be rendered are defined in terms of primitive data, so that when the primitive is a triangle, its primitive data may be defined in terms of the X, Y, Z and W coordinates of its vertices, as well as the red, green and blue and alpha color values of each vertex (of course, additional primitive data may be used in specific applications). The three-dimensional pipeline interpolates the primitive data to compute the coordinates and colors of display screen pixels that represent each primitive, and the R, G and B color values for each pixel.

The availability of graphics processing is becoming increasingly important, and not only in entertainment related applications (e.g., video games, DVD systems, direct broadcast satellites, production quality film animation tools, etc.), but in many other broader areas, such as education, video conferencing, video editing, interactive user interfaces, computer-aided design and computer-aided manufacturing ("CAD/CAM"), scientific and medical imaging, business applications, and electronic publishing, among others.

Conventional image processors are commonly built with separate functional units for handling two-dimensional (e.g., decoder, quantization controller, motion compensation controller, etc.) and three dimensional image processing operations (e.g., a geometry accelerator, a rasterizer, etc.). A primary disadvantage to such implementations is the relative size of the processing logic associated with the functional units necessary to provide the above-described multiple pipelined architecture.

Further, there are symmetries among various processes performed by certain ones of the functional units associated with each of the two image processing pipelines, however, contemporary implementations fail to utilize the same to implement multi-modal units that meet the functional requirements of both two- and three-dimensional image processing pipelines.

Therefore, while an ongoing need exists in the art for improved image processors that include multiple instruction pipelines, a particular need has arisen in the art for a multiple instruction pipeline image processor that efficiently utilizes such inherent symmetries in implementing two- and three-dimensional image processing pipelines, thereby reducing the overall number functional units, and chip area or board space required to support the same.

SUMMARY OF THE INVENTION

The limitations inherent in the above-described prior art are overcome by the present invention which provides broadly circuitry and systems for performing two-dimensional motion compensation using a three-dimensional image processing pipeline, as well as methods of operating the same. The present invention advantageously employs the inherent symmetries of the functional units performing motion compensation operations in the two-dimensional pipeline on the one hand and rasterization operations in the three-dimensional pipeline on the other hand.

According to a primary advantageous embodiment, dual mode sub-processing circuitry is introduced for use in the image processing circuitry having both two- and three-dimensional image processing pipelines. The dual mode sub-processing circuitry is associated with the two- and three-dimensional image pipelines and is operable to perform (i) motion compensation operations associated with the two-dimensional image pipeline in one mode, and (ii) rasterization operations associated the three-dimensional image pipeline in another mode.

In a related advantageous embodiment, the two-dimensional pipeline is MPEG standards compliant. The motion compensation operations of the exemplary MPEG decompression process applies motion vector data to one or more image frames to generate a successive, or "new," image frame. The dual mode sub-processing circuitry is therefore operable to sample reference frames while performing the motion compensation operations of the MPEG decompression process in the one mode, while being operable to perform texture mapping associated with standard three-dimensional rasterization in the other mode. The process of sampling reference frames with bi-linear filtering in two-dimensional motion compensation is similar to performing texture mapping with bilinear filtering in three-dimensional rasterization.

In a further related embodiment, the dual mode sub-processing circuitry is operable to blend samples from a plurality of reference frames while performing the motion compensation operations of the MPEG decompression process in the one mode, while being operable to blend samples from a plurality of texture maps associated with standard three-dimensional rasterization in the other mode. The process of blending, or combining, the samples from multiple reference frames is similar to combining multiple texture maps during rasterization, the primary difference being that the blend factor is static during motion compensation operations, preferably fixed at one half (½).

In yet another related embodiment, the dual mode sub-processing circuitry is operable to process the sampled reference frames using error terms while performing the motion compensation operations of the MPEG decompression process in the one mode, while being operable to perform alpha blending associated with standard three-dimensional rasterization in the other mode. The process of adding error terms to the reference frame samples is similar to the alpha blending sub-process in the three-dimensional rasterization pipeline.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "controller," "processor" and "circuitry" mean any device, system or part thereof that controls at least one operation, such a device, system or part thereof may be implemented in hardware, firmware or software, or some combination of at least two of the same. It should be noted that the functionality associated with any particular controller, processor or circuitry may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
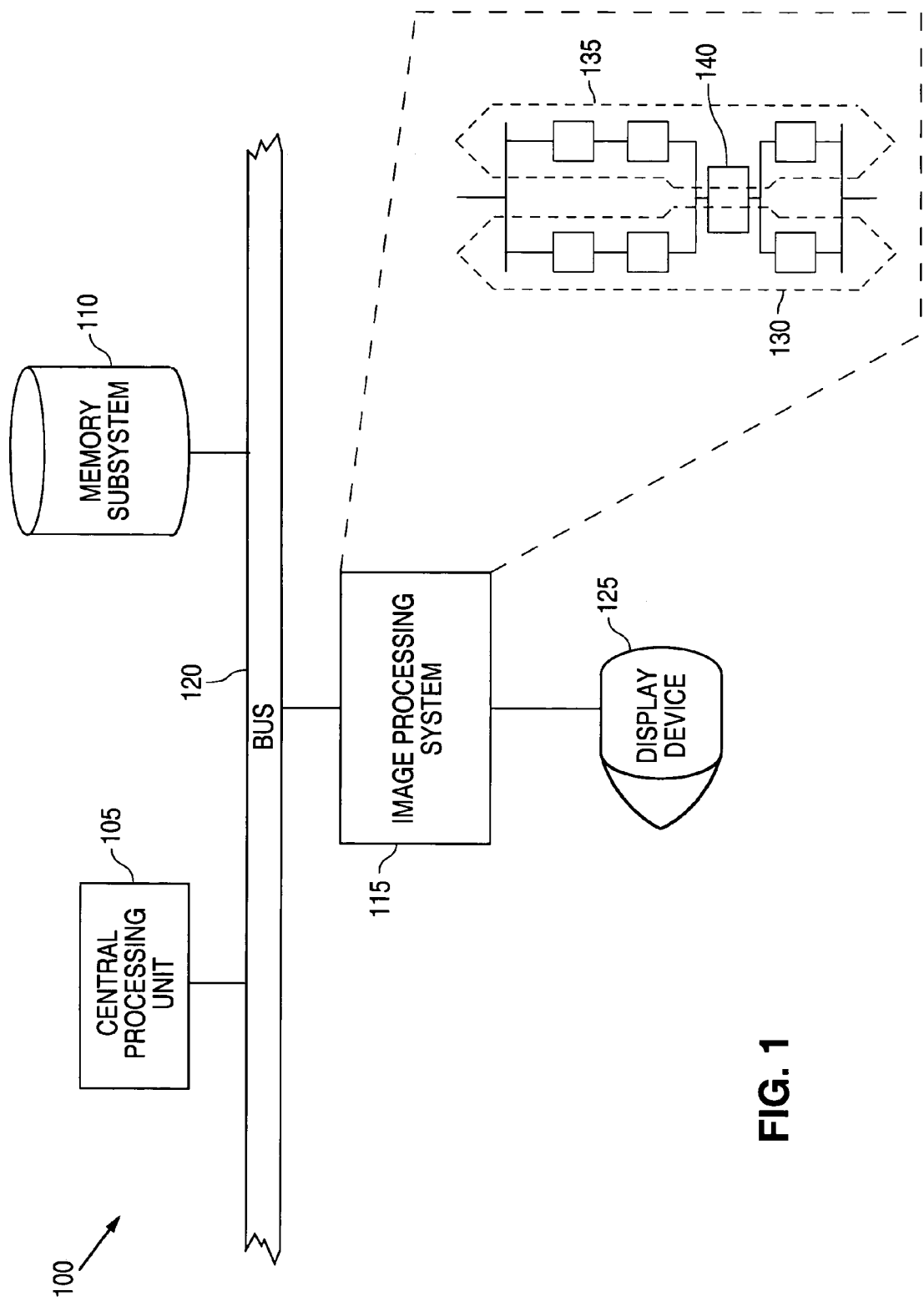
FIG. 1 illustrates a simplified block diagram of an exemplary media processing system, that includes an integrated image processing system according to one embodiment of the present invention.

Turning initially to FIG. 1, illustrated is a simplified block diagram of an exemplary media processing system (generally designated 100), that includes a central processing unit ("CPU") 105, a memory subsystem 110, and integrated image processing system 115, all of which are associated by a high speed bus or system bus 120.

Exemplary CPU 105 may be any suitably arranged type of computer processor or multi-processor. Exemplary memory 110 may be any suitably arranged type of memory subsystem, including random access memory, mass storage device, etc. Exemplary bus 120 may be any suitably arranged type of communication or host bus for communication between CPU 105, memory 110, and exemplary image processing system 115, as well as specialized subsystems. Other elements of media processing system 100 that are not necessary for an understanding of the present invention are not shown for convenience.

Image processing system 115, according to one embodiment of the present invention, is associated with bus 120 by, for instance, bus connectivity logic and with a video or media display system 125 (i.e., systems or devices used to present text, graphics, video, animation, or sound in an integrated way). It is assumed that various other peripheral devices, or other buses, may be connected to bus 120 or media display system 125, as is well known in the art. Media processing system 100 may therefore be any suitably arranged type of video display system, including, without limitation, a computer system, a television, a personal data assistant, a handheld video device, game console, set-top box, or any other type of device or system having the ability to display a video signal.

Image processing system 115 is operable to perform both two- and three-dimensional image processing. Broadly, image processing system 115 includes circuitry for (i) a two-dimensional image pipeline 130, which is operable to process two-dimensional image data to generate successive two-dimensional image frames, and (ii) a three-dimensional image pipeline 135, which is operable to process three-dimensional image data to render successive three-dimensional image frames. Both the two- and three-dimensional image frames are for display in a two-dimensional image space, such as that of exemplary media display system 125.

Image processing system 115 also includes dual-mode sub-processing circuitry 140 that is at least operable to perform (i) motion compensation operations associated with two-dimensional image pipeline 130 in one mode, and (ii) rasterization operations associated three-dimensional image pipeline 135 in another mode. Exemplary dual-mode sub-processing circuitry 140 advantageously employs the inherent symmetries of the functional units performing the motion compensation operations in two-dimensional pipeline 130 on the one hand and the rasterization operations in three-dimensional pipeline 135 on the other hand.

CPU 105 and image processing system 115 preferably communicate data according to a programmed input/output ("I/O") protocol over bus 120. For instance, if a three-dimensional graphics application is executing on CPU 105, then data arrays containing three-dimensional information that define an image for display on the display device 125 may be generated by CPU 105 and transferred to memory 110. The data arrays may include three-dimensional geometry information in a stream of input data packets containing vertex coordinates (or vertices), vertex position, and other information that define triangles, vectors and points in a three dimensional space (commonly referred to as model space). Each input data packet may contain any combination of three-dimensional vertex information, including vertex position, vertex normal, vertex color, facet normal, facet color, texture map coordinates, pick-id's, headers and other information.

CPU 105 may operate to transfer the data to image processing system 115 over bus 120. In an alternate embodiment, image processing system 115 may read in the data arrays using direct memory access ("DMA") access cycles over bus 120. In yet another embodiment, image processing system 115 is associated with memory 110 through a direct port, such as an Advanced Graphics Port ("AGP") promulgated by Intel Corporation.

Likewise, if a two-dimensional image generating application, such as an MEPG-based digital video application, is executing on CPU 105, then data containing two-dimensional information may similarly be generated.

Figure 2:
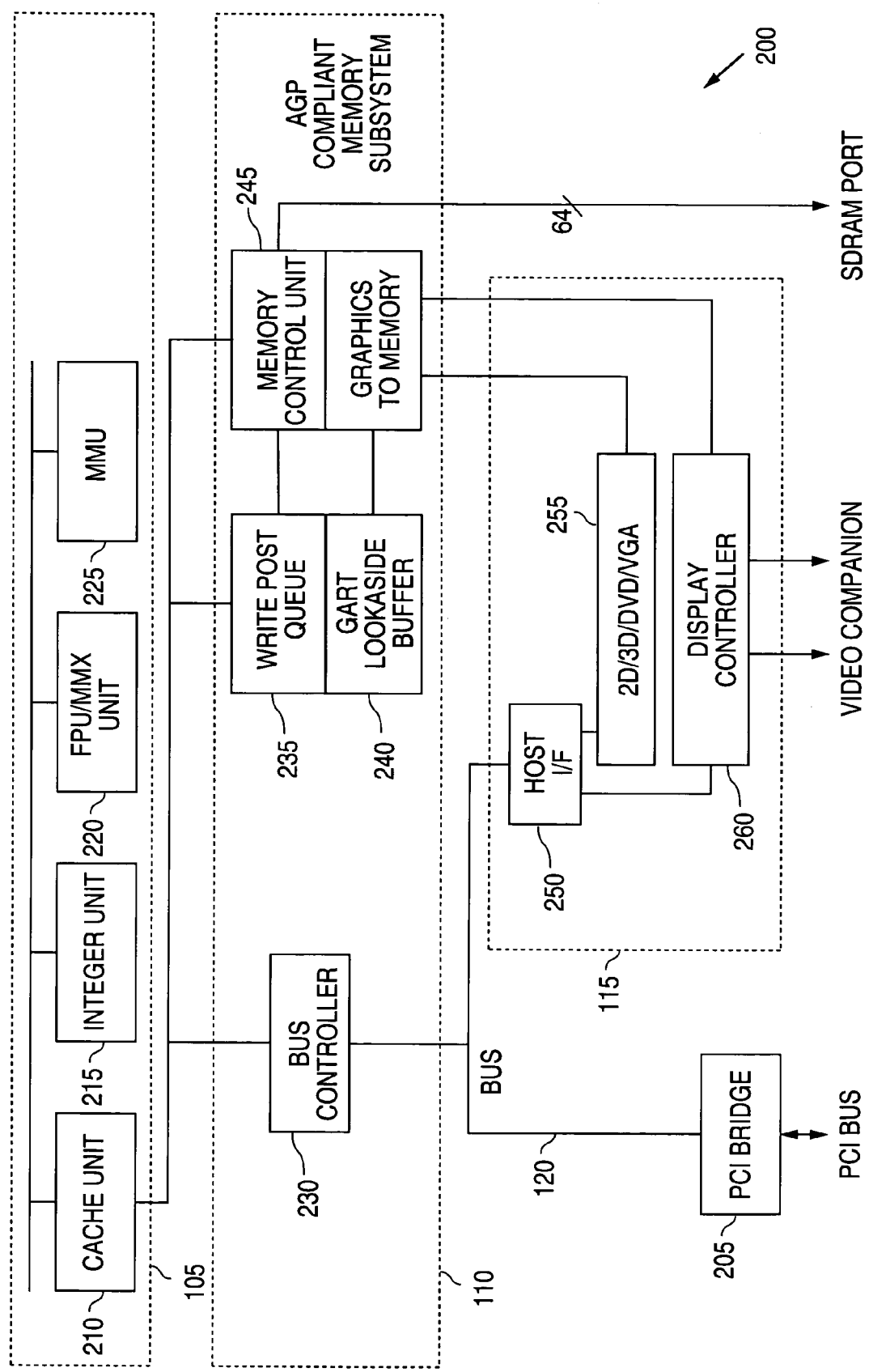
FIG. 2 illustrates a block diagram of an exemplary processor, that includes image processing circuitry according to one embodiment of the present invention.

Turning next to FIG. 2, illustrated is a block diagram of an exemplary integrated processor (generally designated 200), that includes a CPU 105, an AGP compliant memory subsystem 110, image processing system 115, and a PCI bridge 205, all according to one advantageous embodiment of the present invention.

Exemplary CPU 105 includes a cache unit 210, an integer unit 215, a FPU/MMX unit 220 (operable to perform floating-point calculations, including graphics applications) and a MMU 225 (operable to manage memory subsystem 110). Exemplary memory subsystem 110 includes a bus controller 230, a write post queue 235, a look-aside buffer 240, and a memory control unit 245. Exemplary image processing system 115 includes a host interface 250, image processing circuitry 255, and a display controller 260. The functionality of elements of processor 200 that are known and not necessary for an understanding of the present invention are not discussed in further detail for convenience.

Exemplary image processing circuitry 255 includes both two- and three-dimensional image pipelines, and dual-mode sub-processing circuitry (exemplary embodiments of the same are discussed in detail with reference to FIGS. 3 and 4). The dual-mode sub-processing circuitry is at least operable to perform motion compensation operations associated with the two-dimensional image pipeline in one mode, and rasterization operations associated with the three-dimensional image pipeline in another mode.

Figure 3:
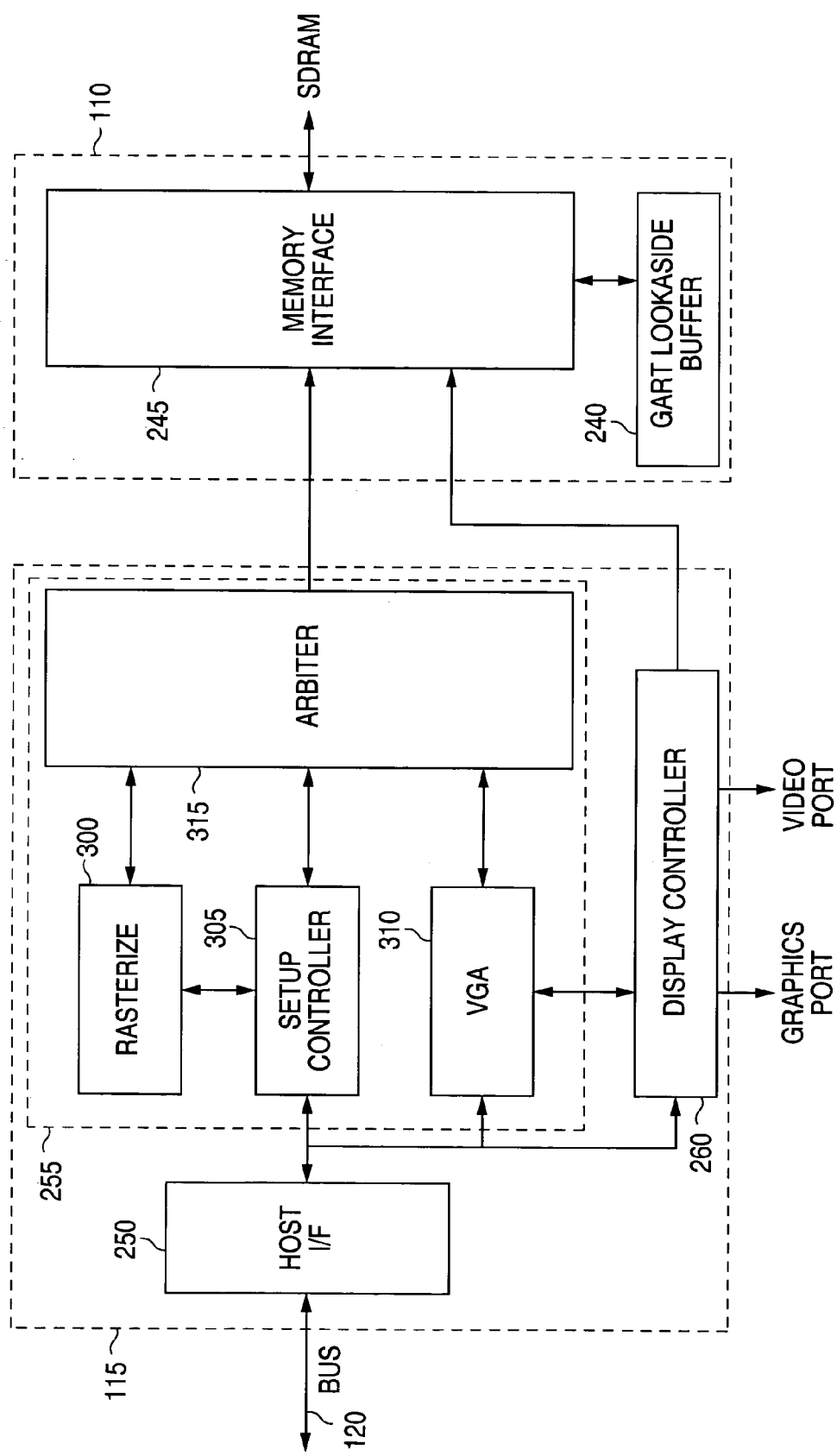
FIG. 3 illustrates a block diagram of an exemplary image processing system, that is associated both a two-dimensional image processing pipeline and a three-dimensional image processing pipeline according to one embodiment of the present invention.

Turning next to FIG. 3, illustrated is a block diagram of an exemplary image processing system 115, shown in cooperation with memory subsystem 110, that is associated with both a two-dimensional image processing pipeline and a three-dimensional image processing pipeline, all according to one advantageous embodiment of the present invention. Exemplary image processing system 115 again includes a host interface 250, image processing circuitry 255, and a display controller 260. For purposes of illustration, concurrent reference is made to FIG. 1.

According to an advantageous embodiment, the three-dimensional image pipeline associated with image processing circuitry 255 is operable to compute three-dimensional graphical transformations. In three-dimensional graphics, it is known that the digital representation of the surface of a given object includes, in addition to traditional two-dimensional qualities like color and brightness, texture qualities, such as transparency, reflectivity and the like. Well-defined textures are important to render realistic three-dimensional images and require significant memory and processing resources.

An important aspect of this embodiment is that memory subsystem 110 is AGP compliant, which allows textures to be stored in main memory, here SDRAM, which increases the rate of transfer of image data between CPU 105, image processing system 115 and the memory.

The three-dimensional pipeline includes three primary stages, namely, (i) transform and lighting, (ii) triangle setup, and (iii) rasterization, the general functionality of each is known. The transform and lighting stage, which operates to processes model coordinates from an executing graphics application to generate screen coordinates, is floating point calculation intensive and may advantageously be performed by CPU 105 to optimize processing resource utilization. The remaining stages may advantageously be performed by image processing system 115.

Also according to the present embodiment, the two-dimensional image pipeline associated with image processing circuitry 255 is operable to compute two-dimensional image operations and transformations, including standard video formats. For purposes of example, the two-dimensional image pipeline supports the MPEG family of digital video compression standards and file formats (MPEG achieves high compression rates by storing changes from one image frame to another and encoding such data using DCT). There are three MPEG standards, namely, MPEG-1, MPEG-2, and MPEG-4 (based on the QUICKTIME™ file format). Common MPEG-1 implementations provide video resolution of 352×240 at 30 frames per second (fps), which produces video quality slightly below the quality of conventional VCR videos. Common MPEG-2 implementations provide video resolutions 720×480 and 1280×720 at 60 fps, with full CD-quality audio, which produces video quality sufficient for major TV standards, including NTSC, HDTV, DVD, and the like.

Exemplary image processing circuitry 255 illustratively includes a three-dimensional rasterizer 300, a setup controller 305, a VGA 310 and an arbiter 315. Exemplary three-dimensional rasterizer 300, according to the present embodiment, is operable to perform common three-dimensional rasterization operations including processing triangles, vectors, planar trapezoids, alpha blending, and the like, as well as to perform texture mapping operations when image processing system 115 is in three-dimensional mode, and to perform two-dimensional motion compensation operations associated with the two-dimensional image pipeline when image processing system 115 is in two-dimensional mode.

Exemplary setup controller 305 is operable to parse a command buffer and to sequence the motion compensation operations for a frame, wherein the command buffer is built by CPU 105 which performs two-dimensional processing operations, such as inverse quantization, inverse DCT, and the like. Exemplary VGA 310, or video graphics array, is a graphics display system that in text mode provides a resolution of 720×400 pixels and in graphics mode provides a resolution of 640×480 (with 16 colors) or 320×200 (with 256 colors). Exemplary arbiter 315 is operable to moderate or control communication among three-dimensional rasterizer 300, a setup controller 305, and a VGA 310 on the one hand and memory subsystem 110 on the other hand.

Figure 4:
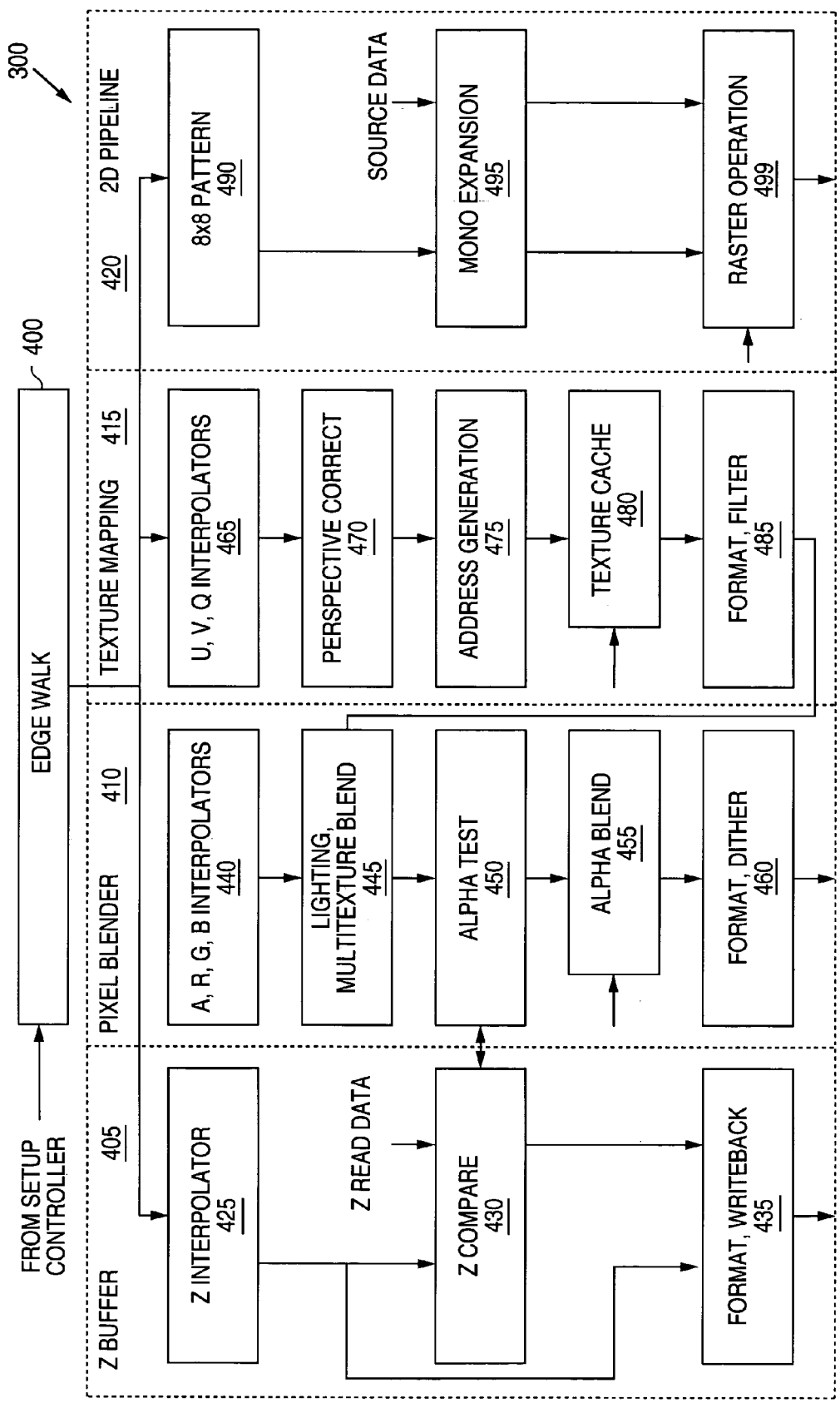
FIG. 4 illustrates a block diagram of an exemplary implementation of a rasterizer, that performs motion compensation operations associated with two-dimensional image processing in one mode and rasterization operations associated three-dimensional image processing in another mode, all according to the principles of the present invention.

Turning next to FIG. 4, illustrated is a block diagram of an exemplary implementation of three-dimensional rasterizer 300, that includes dual-mode image processing circuitry operable to perform motion compensation operations associated with two-dimensional image processing in one mode and traditional rasterization operations associated with three-dimensional image processing in another mode according to the principles of the present invention.

Exemplary three-dimensional rasterizer 300 is operable, in three-dimensional (default) mode, to process triangles, vectors, planar trapezoids, alpha blending, and the like, and to perform texture mapping operations. Texture mapping operations define object textures and "wrap" the same around respective objects in three-dimensional space. Pixels in three-dimensional space, in addition to the properties of position, color, and brightness, have a depth property that indicates where a point lies on an imaginary Z-axis. As rasterizer 300 combines three-dimensional pixels, each having its own depth value, the result is a "three-dimensional surface." Rasterizer 300 supports multiple objects interacting with one another, such that for instance, one object may partially hide another object behind it. Rasterizer 300 is operable to perform hidden surfaces removal by comparing the depth (z) value of a pixel being drawn to the depth value of an existing pixel at that location. If the pixel being drawn is closer to the viewer than the existing pixel, then the new pixel is written to the frame buffer, otherwise the new pixel is discarded (because it is behind what has already been drawn). In addition to the foregoing, and as discussed in detail below, Rasterizer 300 is also operable in two-dimensional mode to perform two-dimensional motion compensation operations associated with the two-dimensional image pipeline.

Three-dimensional rasterizer 300 is operable, in two-dimensional mode, to process two-dimensional image data and to perform motion compensation operations. Motion compensation operations apply motion vector data to one or more current or prior image frames to generate a new or next image frame of video data. There are several known types of motion vectors, and a single encoded MPEG frame can contain an arbitrary combination of motion vector types depending on the image content. Advantageously, each set of motion vectors is used to produce a single macroblock of data. A macroblock is the basic unit on which MPEG compression algorithms are applied, which, according to the exemplary embodiment hereof may be 8×4 (typically, interlaced frames) or 8×8 pixels. Motion compensation operations may suitably be summarized as: (i) sampling "n" reference frames, where n is 0, 1, or 2 (the sample region is a macroblock in size but can be aligned to a half-pixel boundary in both x and y; if the macroblock is on a half-pixel boundary, bilinear filtering must be used); (ii) if two reference frames are sampled, average the samples from the two frames to yield a new macroblock; (iii) if a set of error terms is specified for the macroblock, add the error terms to the results of (ii) (the error terms are normally specified as 9-bit signed values, though some decoders use 8-bit signed values); and (iv) repeat the operation for every macroblock in the new frame being created.

Rasterizer 300 includes edge walk circuitry 400, a Z buffer 405, a pixel blender 410, texture mapping circuitry 415 and a two-dimensional pipeline 420. Exemplary edge walk circuitry 400 is operable to compute the starting and ending x coordinates of each scan line of a trapezoid being drawn, noting that triangles and rectangles are special types of trapezoids. Exemplary Z buffer 405 is a memory system operable to store Z-axis values of pixels in three-dimensional graphics applications, and includes a Z interpolator 425, Z compare circuitry 430, and format/writeback circuitry 435. Exemplary pixel blender 410 is operable to combine pixels, in both two- and three-dimensional space, in a manner suitable to account for interaction among associated pixels in two-dimensional image space. Pixel blender 410 includes A/R/G/B interpolator 440, lighting/mixture blend circuitry 445, alpha test circuitry 450, alpha blend circuitry 455, and format/dither circuitry 460. Exemplary texture mapping circuitry 415 is operable to define and to map digital representations of surfaces, or textures, for objects in three-dimensional image space, and to perform motion compensation operations in two-dimensional image space. Texture mapping circuitry 415 includes U/V/Q interpolator 465, perspective correct circuitry 470, address generation circuitry 475, texture cache circuitry 480, and format/filter circuitry 485. Exemplary two-dimensional pipeline 420 is operable to process two-dimensional image data to perform conventional functions, such as rectangle fills, block moves, text, line drawing, etc. Two-dimensional pipeline 420 includes "8×8" pattern circuitry 490, mono expansion circuitry 495 and raster operation circuitry 499.

The conventional functionality of each of the elements of Z buffer 405, pixel blender 410, texture mapping circuitry 415 and two-dimensional pipeline 420 are generally known and specific discussion of such functionality is not necessary for an understanding of the present invention and are not discussed in further detail for convenience.

For purposes of describing the present embodiment, it is advantageous to discuss those functional elements of rasterizer 300 comprising dual mode sub-processing circuitry (illustratively shown as block 140 in FIG. 1), which collectively are associated with each of the two-dimensional and three-dimensional image pipelines.

Exemplary dual-mode sub-processing circuitry includes lighting/mixture blend circuitry 445, alpha blend circuitry 455, format/dither circuitry 460, U/V/Q interpolator 465, address generation circuitry 475, texture cache circuitry 480, format/filter circuitry 485, "8×8" pattern circuitry 490, mono expansion circuitry 495, and raster operation circuitry 499. Collectively, the foregoing circuitry is operable according to the principles hereof to perform rasterization operations associated said three-dimensional image pipeline in a default mode and to perform motion compensation operations associated with the two-dimensional image pipeline in the other mode.

Exemplary lighting/mixture blend circuitry 445 is operable to combine pixels, in both two- and three-dimensional space, in a manner suitable to account for interaction among associated pixels in an image space based upon lighting. Particularly, in three-dimensional image processing mode, lighting/mixture blend circuitry 445 operates to combine multiple textures and the color from ARGB interpolator 440 using a variety of multiply/add operations, and in two-dimensional image processing mode it operates to combine multiple reference frames by averaging.

Exemplary alpha blend circuitry 455 is operable to combine pixels, in both two- and three-dimensional space, in a manner suitable to account for interaction among associated pixels in image space based upon depth. Particularly, in three-dimensional image processing mode, alpha blend circuitry 455 operates to combine a new pixel value an existing pixel value in memory to preclude transparency effects, and in two-dimensional image processing mode it operates to add error terms to the combined reference frames.

Exemplary format/dither circuitry 460 is operable to convert pixel data from the format used with in rasterizer 300 to the format stored in memory. Particularly, in three-dimensional image processing mode, format/dither circuitry 460 operates to convert 32-bit pixels (888 ARGB, i.e., 8 bits each of A, R, G, and B) to a variety of formats (e.g., 565 RGB, 4444 ARGB), and in two-dimensional image processing mode it operates to pack four consecutive pixels of a macroblock into a 32-bit quantity to write to memory.

Exemplary U/V/Q interpolator 465 is operable to generate U, V and Q values of pixels in three-dimensional graphics applications based upon other known values. Particularly, in three-dimensional image processing mode, U/V/Q interpolator 465 operates to compute U, V, and Q at each pixel given initial values at one vertex and slopes along the scan line and edge. U, V, and Q specify which pixel with a texture map is applied to the current pixel, and in two-dimensional image processing mode it operates to compute the starting location of the next group of four pixels within a reference frame.

Exemplary address generation circuitry 475 converts U, V, and Q values to memory addresses for fetching texture data. Particularly, in three-dimensional image processing mode, address generation circuitry 475 operates to use (U/Q, V/Q) as a two-dimensional index into a texture map, and in two-dimensional image processing mode it operates to use U as a linear (byte) offset into a reference frame and V as the byte offset between successive scan lines in a reference frame.

Exemplary texture cache circuitry 480 is operable to provide fast access to frequently used texture or reference frame data. Particularly, in three-dimensional image processing mode, texture cache circuitry 480 operates to provide up to four pixels—(u,v), (u+1,v), (u,v+1), (u+1,v+1),—for bilinear filtering, and in two-dimensional image processing mode it operates to provide up to four sets of four pixels from the reference frame—[u:u+3], [u+1:u+4], [+v:u+v+3], [u+v+1:u+v+4].

Exemplary format/filter circuitry 485 is operable to convert from pixel format in memory to four 8-bit components and perform bilinear filtering on each component. Recall that texture cache 480 provides up to four pixels or sets of pixels corresponding to the four corners of a bilinear filter cell. Particularly, in three-dimensional image processing mode, format/filter circuitry 485 operates to convert to 8888 ARGB and performs bilinear filtering based on subtextel positioning (i.e., fractional bits of U/Q and V/Q), and in two-dimensional image processing mode it operates to perform bilinear filtering on four pixels based on half-pixel offsets in x and y.

Exemplary "8×8" pattern circuitry 490 is operable to provide a repeating pattern of 8×8 pixels in size—typically used in rectangle fills. The output of pattern circuitry 490 is used as the pattern operand for raster operation circuitry 499. Exemplary mono expansion circuitry 495 is operable to convert one bit per pixel to a foreground and background color. This circuitry is used with 1-bit-per-pixel patterns or text glyph (font) data. Exemplary raster operation circuitry 499 is operable to combine pattern, source, and destination data in an arbitrary fashion. Pattern comes from the 8×8 pattern circuitry. Source can come from a location in the frame buffer (e.g., rectangle copy operation) or the host CPU. Destination is the current value in the frame buffer at the location that will be written with the result of the raster operation.

Figure 5:
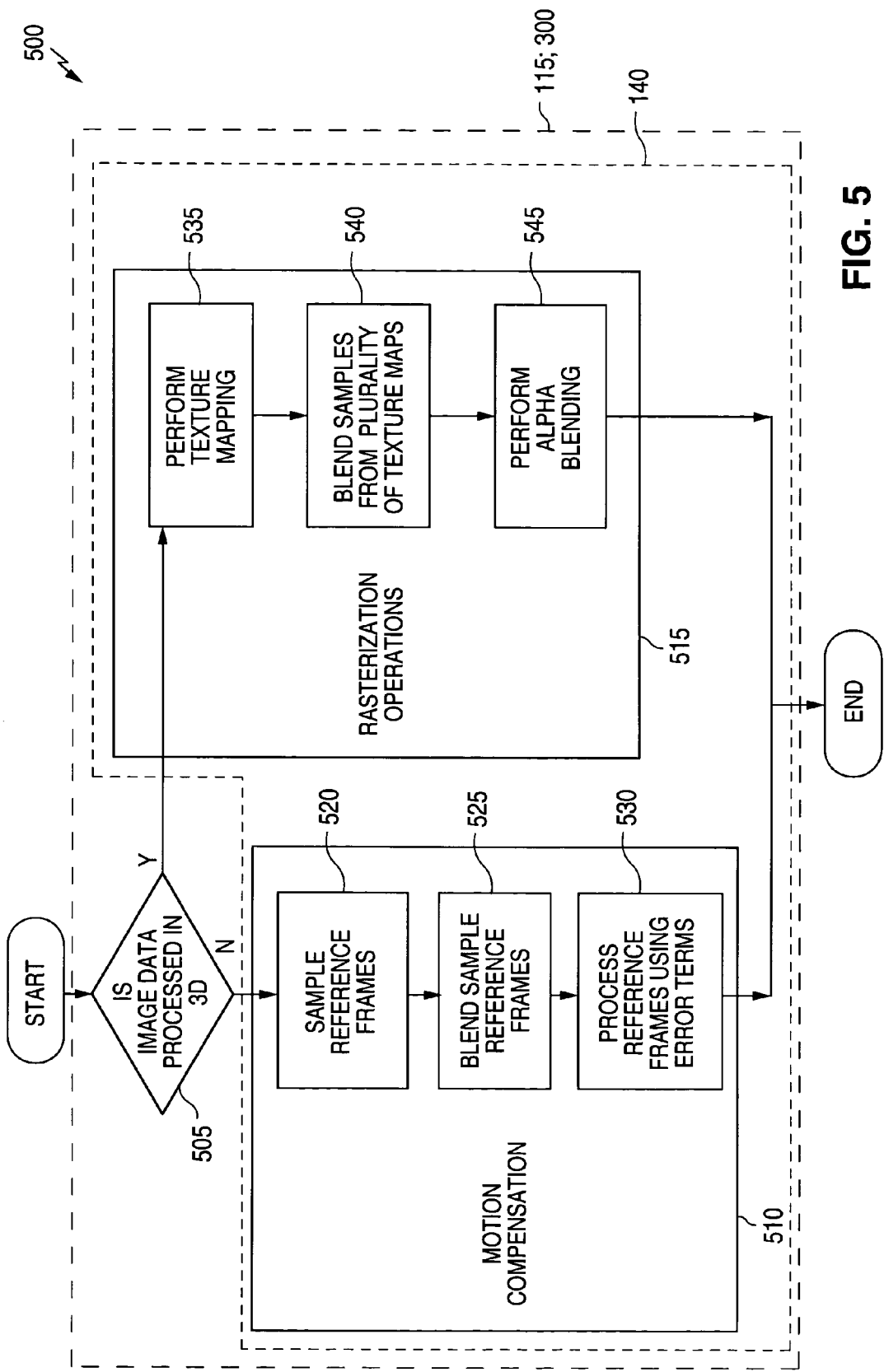
FIG. 5 illustrates a flow diagram of an exemplary method of operating an image processing system, particularly the exemplary rasterizer of FIG. 4, in accordance with the principles of the present invention.

Turning now to FIG. 5, illustrated is a flow diagram (generally designated 500) of an exemplary method of operating an image processing system 115, particularly the exemplary rasterizer 300 of FIGS. 3 and 4, all in accordance with the principles of the present invention. For purposes of illustration, concurrent reference is made to FIGS. 1 to 4 which introduced image processing circuitry 115 that comprised two-dimensional image pipeline 130, three-dimensional image pipeline 135, and dual-mode sub-processing circuitry 140.

Two-dimensional image pipeline 130 is operable to process two dimensional image data to generate successive two-dimensional image frames for display in a two-dimensional image space, whereas three-dimensional image pipeline 135 is operable to process three-dimensional image data to render successive three-dimensional image frames for display in a two-dimensional image space. Dual-mode sub-processing circuitry 140 is associated with both pipelines.

To begin, a determination is made as to whether image processing circuitry 115 is to process image data in two- or three-dimension mode (decision step 505). If image processing circuitry 115 is in two-dimensional mode ("N" branch of decision step 505), dual-mode sub-processing circuitry 140 performs motion compensation operations associated with two-dimensional image pipeline 130 (process step 510). If image processing circuitry 115 is in three-dimensional mode ("Y" branch of decision step 505), dual-mode sub-processing circuitry 140 performs rasterization operations associated three-dimensional image pipeline 135 (process step 515).

In two-dimensional mode, dual-mode sub-processing circuitry 140 performs motion compensation operations by sampling reference frames (process step 520), then blending samples from a plurality of reference frames (process step 525), and then processing the plurality of reference frames using error terms (process step 530). In three-dimensional mode, dual-mode sub-processing circuitry 140 performs texture mapping (process step 535), blending samples from a plurality of texture maps (process step 540), and performing alpha blending (process step 545), wherein, according to the present embodiment, performs alpha blending, in part, by processing at least 8- and 9-bit signed values.

Although the present invention has been described in detail, those skilled in the art should understand that they can make various changes, substitutions and alterations herein without departing from the spirit and scope of the invention in its broadest form.

What is claimed is:

1. Image processing circuitry, comprising:
   a two-dimensional image pipeline having a plurality of stages including a first stage and a last stage that is operable to process two dimensional image data to generate successive two-dimensional image frames for display in a two-dimensional image space;
   a three-dimensional image pipeline having a plurality of stages including a first stage and a last stage that is operable to process three-dimensional image data to render successive three-dimensional image frames for display in a two-dimensional image space; and
   dual mode sub-processing circuitry, associated with each of said two-dimensional image pipeline and said three-dimensional image pipelines, that is operable in a selected one of a two-dimensional mode and a three-dimensional mode, wherein when in said two-dimensional mode said dual mode sub-processing circuitry performs motion compensation operations associated with said two-dimensional image pipeline at an intermediate stage thereof and wherein when in said three-dimensional mode said dual mode sub-processing circuitry performs rasterization operations associated with said three-dimensional image pipeline at an intermediate stage thereof.

2. The image processing circuitry set forth in claim 1 wherein a portion of said dual mode sub-processing circuitry is further operable to sample reference frames in said two-dimensional mode and to perform texture mapping in said three-dimensional mode.

3. The image processing circuitry set forth in claim 1 wherein a portion of said dual mode sub-processing circuitry is further operable to blend samples from a plurality of reference frames in said two-dimensional mode and to blend samples from a plurality of texture maps in said three-dimensional mode.

4. The image processing circuitry set forth in claim 2 wherein a portion of said dual mode sub-processing circuitry is further operable to process said plurality of reference frames using error terms in said two-dimensional mode and to perform alpha blending in said three-dimensional mode.

5. The image processing circuitry set forth in claim 1 wherein the image processing circuitry is operable to support at least one MPEG standard.

6. The image processing circuitry set forth in claim 1 further comprising an alpha blend sub-circuitry that is operable to process at least 8- and 9-bit signed values.

7. For use in image processing circuitry that comprises a two-dimensional image pipeline having a plurality of stages including a first stage and a last stage and a three-dimensional image pipeline having a plurality of stages including a first stage and a last stage, said two-dimensional image pipeline operable to process two dimensional image data to generate successive two-dimensional image frames for display in a two-dimensional image space, and said three-dimensional image pipeline operable to process three-dimensional image data to render successive three-dimensional image frames for display in a two-dimensional image space, a method of operating dual mode sub-processing circuitry that is associated with both of said pipelines, said method comprising:
   determining whether said dual-mode sub-processing circuitry is in a two-dimensional mode or a three-dimensional mode;
   performing motion compensation operations associated with said two-dimensional image pipeline at an intermediate stage thereof using said dual-mode sub-processing circuitry in said two-dimensional mode; and
   performing rasterization operations associated said three-dimensional image pipeline at an intermediate stage thereof using said dual-mode sub-processing circuitry in said three-dimensional mode.

8. The method of operating said dual mode sub-processing circuitry set forth in claim 7 further comprising:
   sampling a plurality of reference frames in said two-dimensional mode; and
   performing texture mapping in said three-dimensional mode.

9. The method of operating said dual mode sub-processing circuitry set forth in claim 7 further comprising blending one of samples from a plurality of reference frames in said two-dimensional mode and samples from a plurality of texture maps in said three-dimensional mode.

10. The method of operating said dual mode sub-processing circuitry set forth in claim 8 further comprising:
    processing said plurality of reference frames using error terms in said two-dimensional mode; and
    performing alpha blending in said three-dimensional mode.

11. The method of operating said dual mode sub-processing circuitry set forth in claim 7 further comprising switching from said three-dimensional mode to said two-dimensional mode to perform motion compensation in accordance with at least one MPEG standard.

12. The method of operating said dual mode sub-processing circuitry set forth in claim 10 wherein performing alpha blending further comprises processing at least 8- and 9-bit signed values.

13. The method of operating said dual mode sub-processing circuitry set forth in claim 7 further comprising controlling said dual mode sub-processing circuitry.

14. Mode control circuitry for use in an image processing system having a two-dimensional image pipeline having a plurality of stages including a first stage and a last stage that processes two dimensional image data to generate successive two-dimensional image frames and a three-dimensional image pipeline having a plurality of stages including a first stage and a last stage that is operable to process three-dimensional image data to render successive three-dimensional image frames, said mode control circuitry comprising:
    dual mode sub-processing circuitry, associated with each of said two-dimensional and said three-dimensional image pipelines, that is operable in a selected one of a two-dimensional mode and a three-dimensional mode, wherein when in said two-dimensional mode said dual mode sub-processing circuitry performs motion compensation operations associated with said two-dimensional image pipeline at an intermediate stage thereof and wherein when in said three-dimensional mode said dual mode sub-processing circuitry performs rasterization operations associated with said three-dimensional image pipeline at an intermediate stage thereof; and
    a controller that is operable to control said dual mode sub-processing circuitry to perform said motion compensation operations in said two-dimensional mode and to perform said rasterization operations in said three-dimensional mode.

15. The mode control circuitry set forth in claim 14 wherein a portion of said dual mode sub-processing circuitry is further operable to sample a plurality of reference frames in said two-dimensional mode and to perform texture mapping in said three-dimensional mode.

16. The mode control circuitry set forth in claim 14 wherein a portion of said dual mode sub-processing circuitry is further operable to blend samples from a plurality of reference frames in said two-dimensional mode and to blend samples from a plurality of texture maps in said three-dimensional mode.

17. The mode control circuitry set forth in claim 15 wherein a portion of said dual mode sub-processing circuitry is further operable to process said plurality of reference frames using error terms in said two-dimensional mode and to perform alpha blending in said three-dimensional mode.

18. The mode control circuitry set forth in claim 14 wherein said dual mode sub-processing circuitry is operable to support at least one MPEG standard.

19. The mode control circuitry set forth in claim 14 further comprising an alpha blend sub-circuitry that is operable to process at least 8-bit and 9-bit signed values.

20. For use in image processing circuitry that comprises a two-dimensional image pipeline having a plurality of stages including a first stage and a last stage and a three-dimensional image pipeline having a plurality of stages including a first stage and a last stage, said two-dimensional image pipeline operable to process two dimensional image data to generate successive two-dimensional image frames for display in a two-dimensional image space, and said three-dimensional image pipeline operable to process three-dimensional image data to render successive three-dimensional image frames for display in a two-dimensional image space, a method of operating mode control circuitry that is associated with both of said pipelines, said method comprising:
determining whether dual mode sub-processing circuitry is in a two-dimensional mode or a three-dimensional mode; and
controlling said dual mode sub-processing circuitry to perform either motion compensation operations associated with said two-dimensional image pipeline at an intermediate stage thereof in said two-dimensional mode, or rasterization operations associated with said three-dimensional image pipeline at an intermediate stage thereof in said three-dimensional mode.

21. The method of operating said mode control circuitry set forth in claim 20 further comprising:
sampling a plurality of reference frames in said two-dimensional mode; and
performing texture mapping in said three-dimensional mode.

22. The method of said operating mode control circuitry set forth in claim 20 further comprising:
blending samples from a plurality of reference frames in said one two-dimensional mode; and
blending samples from a plurality of texture maps in said other three-dimensional mode.

23. The method of operating said mode control circuitry set forth in claim 21 further comprising:
processing said plurality of reference frames using error terms in said one two-dimensional mode; and
performing alpha blending in said three-dimensional mode.

24. The method of operating said mode control circuitry set forth in claim 20 wherein said dual mode sub-processing circuitry is operable to support at least one MPEG standard.

25. The method of operating mode control circuitry set forth in claim 20 further comprising controlling said dual-mode sub-processing circuitry using an alpha blend sub-circuitry that is operable to process at least 8-bit and 9-bit signed values.

26. A media processing system having a central processing unit, a memory subsystem, an image processing system, and a display system, said media processing system comprising:
a two-dimensional image pipeline having a plurality of stages including a first stage and a last stage that is operable to process two dimensional image data to generate successive two-dimensional image frames for display in a two-dimensional image space of said display system;
a three-dimensional image pipeline having a plurality of stages including a first stage and a last stage that is operable to process three-dimensional image data to render successive three-dimensional image frames for display in a two-dimensional image space of said display system; and
dual mode sub-processing circuitry, associated with each of said two-dimensional image pipeline and said three-dimensional image pipeline, that is operable in a selected one of a two-dimensional mode and a three-dimensional mode, wherein when in said two-dimensional mode said dual mode sub-processing circuitry performs motion compensation operations associated with said two-dimensional image pipeline at an intermediate stage thereof and wherein when in said three-dimensional mode said dual mode sub-processing circuitry performs rasterization operations associated with said three-dimensional image pipeline at an intermediate stage thereof.

27. Processing apparatus comprising:
a first specialty pipeline having a plurality of stages including a first stage and a last stage;
a second specialty pipeline having a plurality of stages including a first stage and a last stage; and
dual mode sub-processing circuitry operable in a selected one of first and second modes wherein in said first mode said dual-mode sub-processing circuitry forms an intermediate stage of said first specialty pipeline and in said second mode said dual-mode sub-processing circuitry forms an intermediate stage of said second specialty pipeline.

28. The processing apparatus of claim 27 wherein said first specialty pipeline comprises a two-dimensional image pipeline that is operable to process two dimensional image data to generate successive two-dimensional image frames for display in a two-dimensional image space of a display system.

29. The processing apparatus of claim 28 wherein said second specialty pipeline is operable to process three-dimensional image data to render successive three-dimensional image frames for display in a two-dimensional image space of said display system.

30. The processing apparatus of claim 29 wherein when in said first mode said dual mode sub-processing circuitry performs motion compensation operations associated with said two-dimensional image pipeline and when in said second mode said dual mode sub-processing circuitry performs rasterization operations associated with said three-dimensional image pipeline.

* * * * *